(12) United States Patent
Sharifi et al.

(10) Patent No.: US 10,803,391 B2
(45) Date of Patent: Oct. 13, 2020

(54) MODELING PERSONAL ENTITIES ON A MOBILE DEVICE USING EMBEDDINGS

(71) Applicant: GOOGLE INC., Mountain View, CA (US)

(72) Inventors: Matthew Sharifi, Kilchberg (CH); David Petrou, Brooklyn, NY (US); Pranav Khaitan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1182 days.

(21) Appl. No.: 14/812,877

(22) Filed: Jul. 29, 2015

(65) Prior Publication Data
US 2017/0032257 A1  Feb. 2, 2017

(51) Int. Cl.
*G06N 5/04*  (2006.01)
*G06N 20/00* (2019.01)
(Continued)

(52) U.S. Cl.
CPC ............. *G06N 5/04* (2013.01); *G06F 3/0481* (2013.01); *G06F 16/24578* (2019.01);
(Continued)

(58) Field of Classification Search
None
See application file for complete search history.

(56) References Cited

U.S. PATENT DOCUMENTS 7,917,943 B1 * 3/2011 Dreymann ............. G06Q 10/00
                                                  709/206
8,326,792 B2    12/2012 Goraya
(Continued)

FOREIGN PATENT DOCUMENTS

CN       104598617      5/2015
CN       104636466      5/2015
(Continued)

OTHER PUBLICATIONS

Weston, J. et al. (2010). "Large scale image annotation: learning to rank with joint word-image ennbeddings". Machine Learning, vol. 81, Issue 1, pp. 21-35. First online Jul. 27, 2010. DOI: 10.1007/s10994-010-5198-3 (Year: 2010).*
(Continued)

*Primary Examiner* — Kamran Afshar
*Assistant Examiner* — Benjamin J Buss
(74) *Attorney, Agent, or Firm* — Middleton Reutlinger

(57) ABSTRACT

Systems and methods are provided for a personal entity modeling for computing devices. For example, a computing device comprises at least one processor and memory storing instructions that, when executed by the at least one processor, cause the mobile device to perform operations including identifying a personal entity in content generated for display on the mobile device, generating training examples for the personal entity from the content, and updating an embedding used to model the personal entity using the training examples. The embedding may be used to make predictions regarding the personal entity. For example, the operations may also include predicting an association between a first personal entity displayed on the computing device and a second entity based on the embedding, and providing a recommendation, to be displayed on the computing device, related to the second entity.

21 Claims, 7 Drawing Sheets

(51) Int. Cl.
*G06K 9/62* (2006.01)
*G06N 5/02* (2006.01)
*G06F 40/295* (2020.01)
*G06F 3/0481* (2013.01)
*G06F 16/2457* (2019.01)
*G06F 16/36* (2019.01)

(52) U.S. Cl.
CPC ............ *G06F 16/36* (2019.01); *G06F 40/295* (2020.01); *G06K 9/6276* (2013.01); *G06N 5/022* (2013.01); *G06N 20/00* (2019.01)

(56) References Cited

U.S. PATENT DOCUMENTS

| | | | |
|---|---|---|---|
| 8,719,191 B2 | 5/2014 | Baughman | |
| 8,949,358 B2 | 2/2015 | Shen et al. | |
| 8,983,826 B2 | 3/2015 | Brdiczka et al. | |
| 9,129,227 B1* | 9/2015 | Yee | G06F 16/335 |
| 9,202,203 B2* | 12/2015 | Tsai | H04L 51/00 |
| 2004/0058694 A1* | 3/2004 | Mendiola | H04L 51/04 |
| | | | 455/466 |
| 2006/0031310 A1* | 2/2006 | Lee | G06Q 10/107 |
| | | | 709/206 |
| 2006/0095653 A1* | 5/2006 | Fleming | G06F 16/90339 |
| | | | 711/108 |
| 2006/0235873 A1* | 10/2006 | Thomas | G06F 16/9535 |
| | | | 707/999.102 |
| 2007/0081197 A1* | 4/2007 | Omoigui | G06F 16/24575 |
| | | | 358/403 |
| 2007/0168379 A1* | 7/2007 | Patel | G06F 16/58 |
| 2008/0109714 A1* | 5/2008 | Kumar | G06F 17/227 |
| | | | 715/234 |
| 2008/0120385 A1* | 5/2008 | Maoz | G06Q 10/10 |
| | | | 709/206 |
| 2009/0150388 A1 | 6/2009 | Roseman et al. | |
| 2009/0216696 A1* | 8/2009 | Downs | G06F 16/3326 |
| | | | 706/20 |
| 2009/0282012 A1* | 11/2009 | Konig | G06F 17/278 |
| | | | 707/999.003 |
| 2010/0114561 A1* | 5/2010 | Yasin | G06F 40/216 |
| | | | 704/9 |
| 2010/0153324 A1* | 6/2010 | Downs | G06F 40/258 |
| | | | 706/21 |
| 2010/0293247 A1* | 11/2010 | McKee | H04L 51/32 |
| | | | 709/218 |
| 2011/0072052 A1* | 3/2011 | Skarin | G06F 16/22 |
| | | | 707/794 |
| 2012/0166182 A1* | 6/2012 | Ko | G06F 17/276 |
| | | | 704/9 |
| 2013/0060866 A1* | 3/2013 | Davis | H04L 67/30 |
| | | | 709/206 |
| 2013/0097269 A1* | 4/2013 | Plotkin | H04L 51/02 |
| | | | 709/206 |
| 2013/0110671 A1* | 5/2013 | Gray | G06Q 30/06 |
| | | | 705/26.8 |
| 2013/0346069 A1* | 12/2013 | Huang | G10L 15/18 |
| | | | 704/9 |
| 2014/0006962 A1* | 1/2014 | Gu | G06F 3/01 |
| | | | 715/738 |
| 2014/0032358 A1* | 1/2014 | Perkowitz | H04W 4/21 |
| | | | 705/26.7 |
| 2014/0052540 A1* | 2/2014 | Rajaram | G06Q 30/0255 |
| | | | 705/14.66 |
| 2014/0059130 A1* | 2/2014 | Sheinfeld | H04L 65/403 |
| | | | 709/204 |
| 2014/0095629 A1* | 4/2014 | Brown | G06Q 10/1093 |
| | | | 709/206 |
| 2014/0181705 A1* | 6/2014 | Hey | G06F 11/3672 |
| | | | 715/764 |
| 2014/0229467 A1* | 8/2014 | Roseman | G06F 17/278 |
| | | | 707/723 |
| 2014/0282081 A1* | 9/2014 | Stollarski | H04L 51/34 |
| | | | 715/752 |
| 2014/0282136 A1* | 9/2014 | Marantz | G06F 16/17 |
| | | | 715/764 |
| 2014/0324898 A1* | 10/2014 | Li | G06F 16/9535 |
| | | | 707/758 |
| 2015/0033150 A1* | 1/2015 | Lee | H04N 5/23206 |
| | | | 715/753 |
| 2015/0046436 A1* | 2/2015 | Li | G06F 16/287 |
| | | | 707/723 |
| 2015/0088660 A1* | 3/2015 | Song | G06F 3/0481 |
| | | | 705/14.64 |
| 2015/0256491 A1* | 9/2015 | Eatough | H04L 51/046 |
| | | | 709/206 |
| 2015/0269242 A1* | 9/2015 | Dey | G06F 16/285 |
| | | | 707/737 |
| 2015/0331711 A1* | 11/2015 | Huang | G06F 3/0481 |
| | | | 719/320 |
| 2015/0347381 A1* | 12/2015 | Bellegarda | G06F 17/276 |
| | | | 704/9 |
| 2015/0370787 A1* | 12/2015 | Akbacak | G06F 17/2836 |
| | | | 704/2 |
| 2016/0006730 A1* | 1/2016 | Chari | G06F 21/32 |
| | | | 726/7 |
| 2016/0048760 A1* | 2/2016 | Bastide | G06F 16/23 |
| | | | 706/11 |
| 2016/0055246 A1* | 2/2016 | Marcin | G06F 17/278 |
| | | | 707/732 |
| 2016/0094654 A1* | 3/2016 | Raman | G06F 16/5866 |
| | | | 715/733 |
| 2016/0110343 A1* | 4/2016 | Kumar Rangarajan Sridhar ........ |
| | | | G06F 17/2715 |
| | | | 704/9 |
| 2016/0241493 A1* | 8/2016 | Sharp | H04L 51/02 |
| 2017/0004134 A1* | 1/2017 | Pepper, Jr. | G06F 16/24578 |
| 2017/0032257 A1 | 2/2017 | Sharifi et al. | |

FOREIGN PATENT DOCUMENTS

| | | |
|---|---|---|
| JP | 2010217973 A | 9/2010 |
| JP | 2014032434 A | 2/2014 |
| JP | 2014048689 A | 3/2014 |
| JP | 2014528112 A | 10/2014 |
| JP | 5954053 | 7/2016 |
| WO | 2003/088080 A1 | 10/2003 |
| WO | 2009/052308 A1 | 4/2009 |
| WO | WO2012017787 A1 | 10/2013 |

OTHER PUBLICATIONS

Mikolov, T. et al. (2013). "Efficient Estimation of Word Representations in Vector Space". arXiv preprint arXiv:1301.3781 (Year: 2013).*

Bogdanov, E. et al. (Apr. 2010). "Graaasp: a web 2.0 research platform for contextual recommendation with aggregated data". In CHI'10 Extended Abstracts on Human Factors in Computing Systems (pp. 3523-3528). ACM. (Year: 2010).*

Pan, S.J. et al. (2013). "Transfer joint embedding for cross-domain named entity recognition". ACM Transactions on Information Systems, 31(2), 7 (27 pp.). doi:http://dx.doi.org/10.1145/2457465.2457467 (Year: 2013).*

Neelakantan, A. et al. (Apr. 25, 2015). "Learning dictionaries for named entity recognition using minimal supervision" [arXiv]. ArXiv, , 10 pp. Retrieved from arXiv:1504.06650v1 (Year: 2015).*

Fan, K. et al. (2014). "Unsupervised iterative manifold alignment via local feature histograms". IEEE Winter Conference on Applications of Computer Vision. IEEE, doi:http://dx.doi.org/10.1109/WACV.2014.6836051 (Year: 2014).*

Xiong, H. (2009). "A unified framework for kernelization: The empirical kernel feature space". Proceedings of the 2009 Chinese Conference on Pattern Recognition. (CCPR 2009) and the First CJK Joint Workshop on Pattern Recognition (CJKPR): 5 . IEEE. doi:http://dx.doi.org/10.1109/CCPR.2009.5344130 (Year: 2009).*

Torki, M. et al. (2010). "Putting local features on a manifold". 2010 IEEE Conference on Computer Vision and Pattern Recognition (CVPR): 1743-50. IEEE. doi:http://dx.doi.org/10.1109/CVPR.2010.5539843 (Year: 2010).*

(56) References Cited

OTHER PUBLICATIONS

Fu, Z., et al. (Jun. 2015). "Zero-shot object recognition by semantic manifold distance". 2015 IEEE Conference on Computer Vision and Pattern Recognition (CVPR): 2635-44;917. Jun. 7-12, 2015 IEEE. doi:http://dx.doi.org/10.1109/CVPR.2015.7298879 (Year: 2015).*
Ramos, G.G.J. et al. (2015). "Embedded system for real-time person detecting in infrared images/videos using super-resolution and Haar-like feature techniques." 2015 12th International Conference on Electrical Engineering, Computing Science and Automatic Control (CCE). IEEE, Oct. 2015. (Year: 2015).*
Japanese Patent Office; Office Action issued in Application No. 2017-556890 dated Dec. 17, 2018.
The Korean Intellectual Property Office; Office Action issued in Application No. 10-2017-7031186 dated Jan. 31, 2019.
International Search Report and Written Opinion received for PCT Patent Application No. PCT/US2016/044464, dated Oct. 27, 2016, 13 pages.
Minkov et al., "Extracting Personal Names from Email: Applying Named Entity Recognition to Informal Text", Proceedings of Human Language Technology Conference and Conference on Empirical Methods in Natural Language Processing, Oct. 2005, pp. 443-450.
Collobert et al., "Natural Language Processing (Almost) from Scratch", Journal of Machine Learning Research, vol. 12, 2011, pp. 2493-2537.
Mikolov et al., "Efficient Estimation of Word Representations in Vector Space", Sep. 7, 2013, pp. 1-12.
The Japanese Patent Office; Decision of Rejection issued in Application No. 2017-556890 dated Apr. 1, 2019.
The Korean Intellectual Property Office; Office Action issued for Application No. 10-2019-7033842 dated Feb. 20, 2020 (72 Pages).
European Patent Office; Examination Report issued in Application No. 16751408.2 dated Mar. 21, 2019.
Korean Patent Office; Notice of Allowance in Application No. 10-20177031186; 3 pages; dated Aug. 30, 2019.
European Patent Office; Summons in Application No. 16751408.2; 7 pages; dated Sep. 24, 2019.
Japanese Patent Office; Pre-Appeal Examination Report issued in Application No. 2017-556890, dated Sep. 17, 2019.
Intellectual Property India; Office Action issue in Application No. 201747038439; 8 pages; dated Jun. 29, 2020.
Chinese Patent Office; Office Action issued in Application No. 201680025098.3 dated Aug. 3, 2020.

* cited by examiner

MODELING PERSONAL ENTITIES ON A MOBILE DEVICE USING EMBEDDINGS

BACKGROUND

The use of mobile devices, such as smart phones, wearable devices, tablets, laptops, etc., has been increasing. By understanding the content viewed by and interactions of a user, the mobile device can build a much better user experience, for example by offering personalized predictions and assistance to the user. Part of understanding the content and interactions involves mapping entities recognized in the content of the device screen to entities in a knowledge base. While such public knowledge bases can be huge, they will lack many of the personal entities that a user often interacts with.

SUMMARY

Implementations detect and model personal entities in an embedding space. The embedding spaces are learned and adjusted over time, so that the embeddings become a representation of a user's personal knowledge base. The system can model entities in any content generated by a computing device, including screens on a mobile device, email messages in a user's account, updates and posts in a user's social media account, etc. In some implementations such as email systems, detection of personal entities may be based on a user specifically identifying the entity (e.g., in the sender or recipient address of an email). In some implementations, the system may determine what text on a given screen likely constitutes an entity. In some implementations, the system may track the n-grams encountered across applications/screens and when a particular n-gram appears frequently the system may consider the n-gram a personal entity. When a personal entity has not yet been modeled, the system may normalize the name for the entity, assign the entity a random set of feature vectors, and begin modeling the entity.

In modeling the entity, the system may use a continuous bag of words (CBOW)-like training model where the system predicts a personal entity given a feature or a set of features. A feature can include other personal entities (e.g., from past and current screens), a public entity/topic, an application the entity most often appears in, etc. For example, the system may train the model to predict one entity given another entity (e.g., Mary and Rob are both often included in the same email stream or football is commonly discussed in communications to John). In some implementations, a sliding window of captured screen content can be used to provide context for identifying and modeling the personal entities identified in the window. In addition, the system can be trained to predict personal sequences, such as the user typically reads email and then opens a news app.

In one general aspect, a computing device includes at least one processor and memory storing instructions that, when executed by the at least one processor, cause the computing device to perform operations. The operations may include identifying a personal entity in content generated for display on the mobile device, generating training examples for the personal entity from the content, and updating an embedding used to model the personal entity using the training examples. The personal entity may be personal to the user of the mobile device. The embedding may be used to make predictions regarding the personal entity.

In one general aspect, a method includes identifying a first personal entity in content generated for display on a computing device, the first personal entity being associated with an embedding in a personal knowledge base associated with a user of the computing device, predicting an association between the first personal entity and a second entity based on the embedding, and providing a recommendation related to the second entity, the recommendation to be displayed on the computing device.

In one general aspect, a computing system includes at least one processor, a display device, memory storing a personal knowledge base, the personal knowledge base modeling personal entities as embeddings and memory storing instructions that, when executed by the at least one processor, cause the computing system to perform operations. The operations may include identifying features in content generated for display on the display device, identifying a personal entity predicted by the features using an embedding for the personal entity in the personal knowledge base, and providing a recommendation related to the personal entity, the recommendation to be displayed on the display device.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for training a prediction model to model personal entities discovered in content generated for display on a computing device, substantially as shown in and/or described in connection with at least one of the figures, and as set forth more completely in the claims. The embedding for a personal entity accounts for context in that the model determines a particular entity is more likely when encountered in a particular application, when discussing a particular topic, or performing a particular activity, etc.

One or more of the implementations of the subject matter described herein can be implemented so as to realize one or more of the following advantages. As one example, once a modeling of personal entities (e.g., a personal knowledge base) is generated, the system can use it to predict words or phrases based on onscreen content, to identify circles or categories for the personal entities, to enhance on-device search with nearest neighbor retrieval, to personalize predictions (e.g., predict a recipient of a text message based on previous onscreen content, to bias entities related to a particular category when messaging a particular person, etc.), to personalize advertisements, etc. Using embeddings as a representation for personal entities means the system need not make decisions about relationships involving the entity, providing greater flexibility in use of the personal entities. Modeling each personal entity in an embedding space also enables any classifier to use the embeddings as features for a prediction task.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
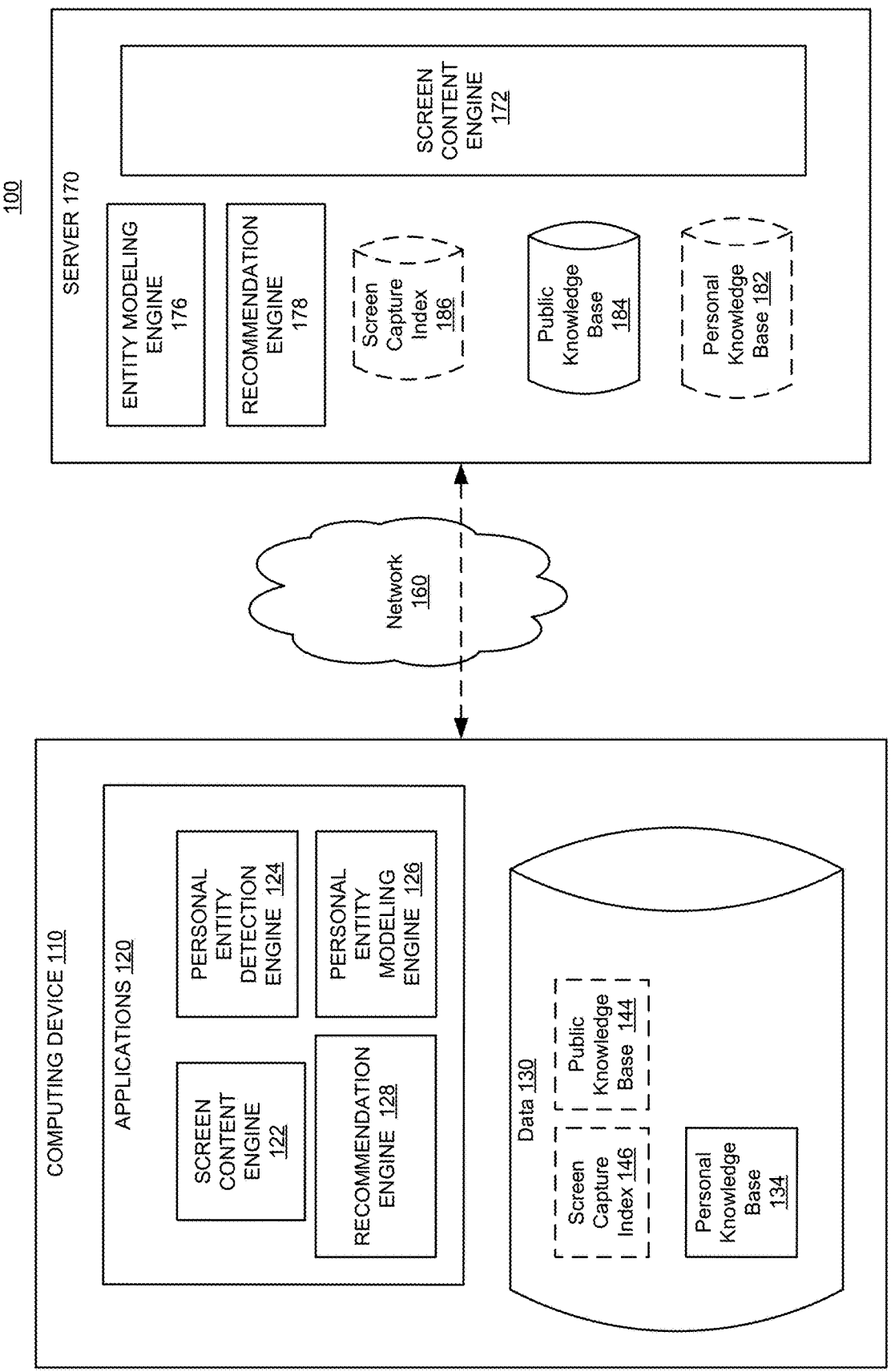
FIG. 1 is a block diagram illustrating an example system in accordance with the disclosed subject matter.

FIG. 1 is a block diagram of a personal entity modeling system in accordance with an example implementation. The system 100 may be used to detect personal (e.g., non-public) entities in content generated for display on a computing device and to model the entities as embeddings used by a machine learning recommendation engine to personalize a user experience on the computing device. Personalizing the user experience can include predicting topics, words, or phrases, identifying clusters of related personal entities, targeted advertising, etc. The system 100 in FIG. 1 can be used by a client-server system, with some data processing or data storage occurring at a server 170. However, other configurations and applications may be used. For example, the data processing and data storage can occur exclusively on the computing device 110. In some implementations, a user of the computing device 110 may indicate that portions of the processing be performed at the server 170. Thus, implementations are not limited to the exact configurations illustrated.

Figure 8:
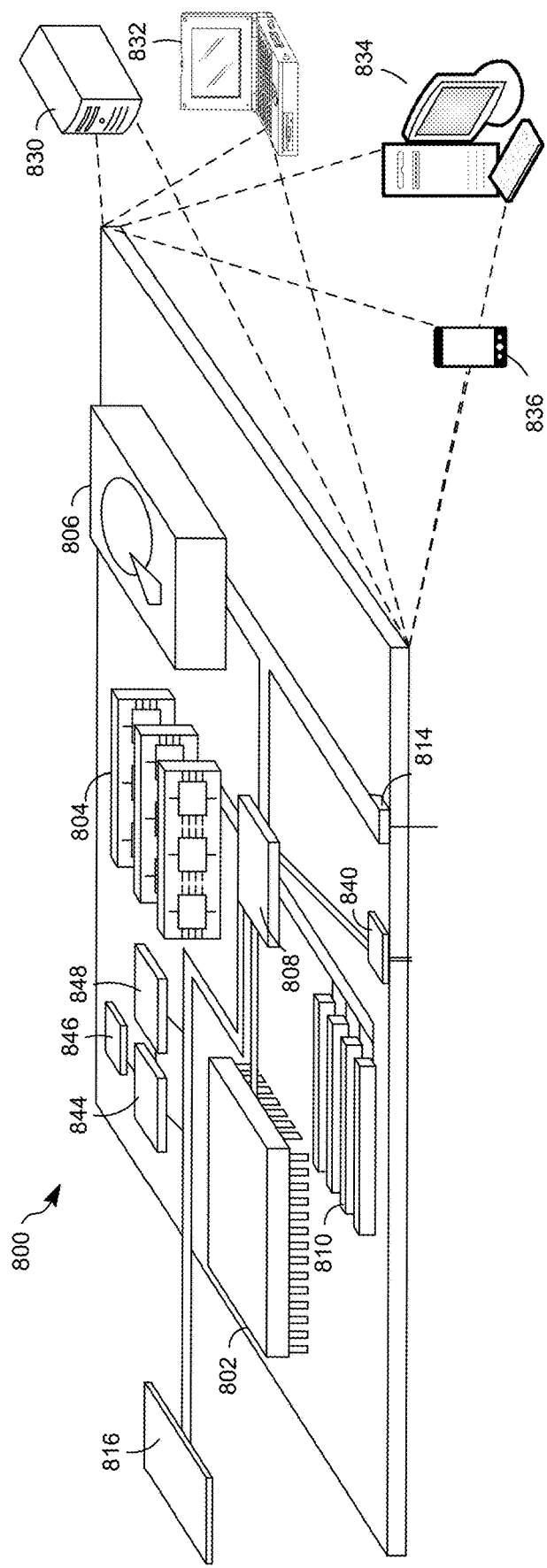
FIG. 8 shows an example of a computer device that can be used to implement the described techniques.

The personal entity modeling system 100 may include a computing device 110. Computing device 110 may be any mobile computing device, such as a smartphone or other handheld computing device, a tablet, a wearable computing device, etc., that operates in a closed mobile environment rather than a conventional open web-based environment. Computing device 110 may also be other types of personal electronic computing devices, such as a laptop or net-based computer, a desktop computer, a television with a processor, etc. Computing device 110 may be an example of computer device 800 or 850, as depicted in FIG. 8. Computing device 110 may be a computing device used by a single user, or can be a computing device shared by multiple users.

Computing device 110 may include one or more processors formed in a substrate configured to execute one or more machine executable instructions or pieces of software, firmware, or a combination thereof. The processors can be semiconductor-based—that is, the processors can include semiconductor material that can perform digital logic. The computing device 110 may thus include one or more computer memories configured to store one or more pieces of data, either temporarily, permanently, semi-permanently, or a combination thereof. The computing device 110 may thus include applications 120, which represent machine executable instructions in the form of software, firmware, or a combination thereof. The components identified in the applications 120 may be part of the operating system or may be applications developed to run using the operating system. In some implementations, applications 120 may be mobile applications. Conventionally, mobile applications operate in a closed environment, meaning that the user employs separate applications to perform activities conventionally performed in a web-based browser environment. For example, rather than going to bookit.com to book a hotel, a user of the computing device 110 can use a mobile application in applications 120 provided by bookit.com. Applications 120 may also include web applications, which may mirror the mobile application, e.g., providing the same or similar content as the mobile application. In some implementations, the applications 120 may include functions performed by an operating system of the computing device 110.

The applications 120 may include a screen content engine 122, a personal entity detection engine 124, a personal entity modeling engine 126, and a recommendation engine 128. In some implementations, one or more of these applications can be provided by the operating system (not shown) of the computing device 110. In some implementations, one or more of these applications can be downloaded and installed by the user.

The screen content engine 122 can include various functionalities. In some implementations, the screen content engine 122 may be configured to get textual information represented on the screen of the computing device from an application program interface (API). In some implementations, the screen content engine 122 may be built into the operating system, which can determine the content of text fields displayed on the screen. The textual information may be considered screen captured content, and each call to the API or each time the content of text fields is determined may be considered a screen capture. In some implementations, the screen content engine 122 may be configured to capture the image displayed on the screen by copying or reading the contents of the device's frame buffer. Thus, the captured screen may be an image and may be referred to as a captured image. The screen content engine 122 may capture the screen at intervals. The interval can be small, for example every half second or every second. In some implementations, the screen content engine 122 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen content engine 122 may increase the interval at which a screen capture occurs when the screen does not change. In other words, when the screen is static, the screen content engine 122 may capture images less often.

The screen content engine 122 may provide the captured content or screen images and metadata to a recognition engine, which may be part of the screen content engine 122 and located on the computing device 110 or a server, such as server 170. If a screen capture image is provided to the recognition engine, the recognition engine may identify words, entities, logos, etc. in the content of the screen capture image. Thus, the recognition engine may generate recognized content, which can be from words as well as from images. The metadata may include the timestamp, the mobile device type, a mobile device identifier, the mobile application running when the content was captured, e.g., the application that rendered the content displayed on the screen, etc. In some implementations, the metadata may also include which applications are active, the location of the device, ambient light, motion of the device, etc. The system may use this additional device information to assist in content analysis (e.g., entity disambiguation), feature generation (e.g., determining context and environment associated with an entity), etc. The recognition engine may thus be configured to perform various types of recognition, such as character recognition, image recognition, logo recognition, etc., using conventional or later developed techniques.

The computing device 110 may also include a personal entity detection engine 124. The personal entity detection engine 124 may be configured to determine which entities recognized by the screen content engine 122 are potential personal entities. An entity may be may be a person, place, item, idea, topic, word, phrase, abstract concept, concrete element, other suitable thing, or any combination of these. Entities may be stored in a knowledge base, which stores not only entities but also information about entities. In some implementations, a knowledge base stores information about entities in the form of relationships between entities. For example, entities in a public knowledge base may be related to each other by labeled edges that represent relationships. A knowledge base, such as public knowledge base 144 or public knowledge base 184, may include public entities. A public entity is an entity that exists in a publically available knowledge base, such as knowledge base 184. The public knowledge base may be generated from information available over the Internet and may be curated by a collection of users. Such public knowledge bases are large, sometimes including millions of entities. In contrast, a personal entity is an entity that is relevant or interesting to the user of a computing device and does not exist in the public knowledge base. For example, a user may be interested in the actor Tom Hanks, but most public knowledge bases have an entity to represent Tom Hanks, so Tom Hanks is not a personal entity. In contrast, the user may text or refer to Tom Smith, a co-worker, often. The co-worker Tom Smith is likely a personal entity because the public knowledge base does not have an entity representing the co-worker, or may have an entity named Tom Smith but based on on-screen context the system may decide that the public Tom Smith is not the same as the entity referred to. Likewise, the user may be interested in rock hounding. Because rock hounding is a more specialized interest, the public knowledge base may not include an entity representing rock hounding. Such an entity may then be a personal entity for the user.

In some implementations, the personal entity detection engine 124 may use fields with known entity types to identify potential personal entities. For example, in an email application or a contacts application, certain text fields are known to contain person entities, such as the to or cc fields of an email. Other fields may be known to include other entity types, such as an address or a phone number, etc. When an application is known to include such entity-typed fields, the personal entity detection engine 124 may use text in the entity-typed fields to identify potential personal entities. The personal entity detection engine 124 may also use other methods of identifying personal entities. For example, the system may use conventional entity identification methods to determine which recognized items are possible entities. Conventional methods involve natural language processing techniques to identify potential personal entities in the content. Natural language processing includes part-of-speech tagging, noun phrase identification, named entity recognition and type assignment, etc. In some implementations, the personal entity detection engine 124 may also track the occurrence of n-grams across applications. The personal entity detection engine 124 may look for n-grams that occur frequently in private content applications, like email, contacts, messaging, comments or posts on social media, etc. that do not occur with the same frequency in public content applications (e.g., news-feeds, reservation applications, games, etc.). The personal entity detection engine 124 may consider n-grams that occur more frequently in personal-content applications than in public-content applications to be personal entities.

In some implementations, the personal entity detection engine 124 may verify whether the potential personal entities occur in a public knowledge base. For example, the public knowledge base, such as knowledge base 144 or 184, may include a text description or descriptions or keywords used to identify an entity as well as disambiguation data. For example, the public knowledge base may also include other entities or words that co-occur with an entity to help determine the difference between two similarly named entities. If the personal entity detection engine 124 finds a match of the potential personal entity in the public knowledge base, the personal entity detection engine 124 may discard the entity. Otherwise, the entity may be considered a personal entity. The personal entity detection engine 124 may normalize the name of the entity and store the personal entity in a personal knowledge base 134. The personal entity detection engine 124 may then provide the entity to the personal entity modeling engine 128 to learn an embedding for the personal entity.

Initially, a personal entity may be assigned an initial embedding. The initial embedding may be random or based on an entity type of the personal entity, when known. The initial embedding may be stored with the entity name in a personal knowledge base 134. The personal entity modeling engine 126 may then continuously train a prediction model, such as a word2vec system, to learn the proper embedding for the personal entity. For example, the personal entity modeling engine 126 may use a continuous bag of words (CBOW)-like model that predicts a personal entity given a set of other personal entities. The other personal entities may occur on the current screen (e.g., the current screen capture) with the personal entity being modeled or in a window of past and/or future screen captures. The length of the window can be implementation dependent. This type of training clusters related personal entities together in the embedding space.

In some implementations, the personal entity modeling engine 126 may train the prediction model to predict the personal entity given a set of public and personal entities that occur with the personal entity, either on the same screen (e.g. the same screen capture event) or in the window of screen capture events. In some implementations, the personal entity modeling engine 126 may be trained to predict structural properties of where and how the personal entity appears in the screen capture content. The structural properties can include font, formatting, or layout properties. This type of training clusters together personal entities appearing in the same context. In some implementations, the personal entity modeling engine 126 may predict a currently executing application, a next application, or a personal entity type given a particular personal entity. This type of training clusters together personal entities of the same type occurring in the same context in the embedding space. These are given as examples of the types of continuous training used for the prediction model. The intended uses of the prediction model may dictate which training methods are used. In some implementations, the personal entity modeling engine 126 may generate training examples that represent multiple prediction types (e.g., examples to predict structural properties and examples to predict the personal entity give other entities). In some implementations, the different types of training examples may be weighted to favor one type over another. For example, training examples predicting structure may be weighted less than training examples predicting the personal entity (or vice-versa). In such an implementation, the higher weighted examples contribute more to the resulting embedding.

A prediction model, such as personal entity modeling engine 126, is any type of machine-learning algorithm, such as a long short-term memory (LSTM) neural network, feed-forward neural network, a support vector machine (SVM) classifier, etc., that can predict a class or value given a set of features. For example, the prediction model can be trained to predict one entity given another entity, a particular mobile application, a set of other entities, a topic, a set of structural properties, etc. The personal entity modeling engine 126 has two modes, a training mode and an inference mode. In the training mode the personal entity detection engine 124 uses feature vectors generated from captured content, (e.g., content displayed on the computing device) as positive training examples for the prediction model. Training examples may be collected over time and used to update the embedding for the personal entity. The feature vectors may depend on what the model is being trained to predict (e.g., another entity, a topic, a set of entities, a mobile application, etc.). In some implementations, training examples for an entity may include what types of actions a user takes subsequent to display of the entity. For example, when a user switches from one mobile application to another mobile application, this context may be used to update the embedding for a personal entity appearing in the first mobile application. Thus, as a particular personal entity is encountered over time the embedding will more accurately reflect the context in which the entity appears and what contexts typically follow. The model may be used in the inference mode to personalize the user experience in various ways, depending on how the model has been trained.

In some implementations, the screen content engine 122 can include an indexing engine configured to index the captured content. The index may also associate a screen capture image with the text, entities, images, logos, etc. identified in the image. Thus, for example, the indexing engine may generate index entries (e.g., stored in screen capture index 146) for a captured image and captured content. In some implementations the indexing engine may be on a server, such as server 170, and the screen content engine 122 may provide the captured image and captured content to the server. The index may be an inverted index, where a key value (e.g., word, phrase, entity, image, logo, etc.) is associated with a list of images (e.g., copies of the captured screen images) that include the key value. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 146. Of course, in some implementations the system may store the index in a user account on a server in addition to or instead of on the computing device 110. The user of the computing device 110 may control when the screen content engine 122 is active. For example, the user may specify that the screen content engine 122 is active only when other specified applications 120 are running (e.g., only when in a social media mobile application). The user may also manually turn the screen content engine 122 on and off, for example via a settings application. In some implementations, the user may invoke the screen content engine 122 with a gesture or action. Disabling the screen content engine 122 may also disable the detection and modeling of personal entities in screen content described herein.

The applications 120 may also include recommendation engine 128. The recommendation engine 128 may use the personal entity modeling engine 126 and personal knowledge base 134 in an inference mode to provide personalized assistance to a user of the computing device 110. Personalized assistance may include various techniques, depending on the implementation. For example, in some implementations, the recommendation engine 128 may determine completions for input based on the context of the input. In another example, the recommendation engine 128 may identify clusters or groups of similar personal entities. For example, the recommendation engine 128 may identify a group of personal entities that share an interest in football, a group of personal entities related to Mexican restaurants, a group of personal entities that share a context, e.g., meeting for lunch on Tuesdays, etc. The recommendation engine 128, or another application, can use the groups to suggest advertisements, additional email or text recipients, topics for discussion, people to share a current screen with, etc. In some implementations, the recommendation engine 128 may include a reconciliation process that suggests merging two personal entities when the embeddings of the two personal entities are close. For example, the recommendation engine 128 may suggest merging or automatically perform the merging of two personal entities when the distance between the embeddings of the two personal entities is within a high threshold, e.g., representing a high degree of similarity. Merging personal entities in the personal knowledge base may enable a personal entity to be identified via various names. Likewise, the recommendation engine 128 may suggest (or automatically perform) splitting one personal entity into two personal entities when an embedding is unstable or training examples for the personal entity are often in disagreement. The above personalization assistance scenarios are provided as examples only and implementations are not limited to the examples given.

The computing device 110 may include data stores 130, which are stored in the memory of the computing device 110 and used by the applications 120. In some implementations, the data stores 130 may include a screen capture index 146 which includes items identified in the screen capture images, and a public knowledge base 144. The public knowledge base 144 may be a graph-based data store that stores data and rules that describe knowledge about the data in a form that provides for deductive reasoning. For example, in a knowledge base, information may be stored about entities in the form of relationships to other entities. An entity may be may be a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. The public knowledge base 144 may be a subset of entities and relationships in a larger knowledge base 184 located at server 170, especially if the large knowledge base 184 includes millions of entities and billions of relationships. For example, the entities and relationships in the public knowledge base 144 may represent the most popular entities and relationships from knowledge base 184, or may be selected based on user preferences. For example, if the user has a profile, entities and relationships may be selected for inclusion in public knowledge base 144 based on the profile or based on the types of entities frequently identified in the content of the screen capture images.

The data stores 130 may include personal knowledge base 134. Personal knowledge base 134 may be stored on a user device, such as computing device 110 and/or on a server 170 in an account associated with the user, such as personal knowledge base 182. The personal knowledge base 134 (and personal knowledge base 182) may store one or more descriptions of the personal entity and an associated embedding for the personal entity. Thus, in the personal knowledge base 134 personal entities are represented by an embedding and identified by one or more textual descriptions. The textual descriptions may be normalized, e.g., removing capitalizations, etc. In some implementations, other information about the personal entity may also be stored in the personal knowledge base 134. For example, an email address, phone number, or social media identifier may be associated with the personal entity, which can assist the recommendation engine 128. For example, when the recommendation engine 128 suggests a personal entity to share a topic with, the recommendation engine 128 may use this additional information to automatically send an email, a text, or a post to the personal entity.

Figure 9:
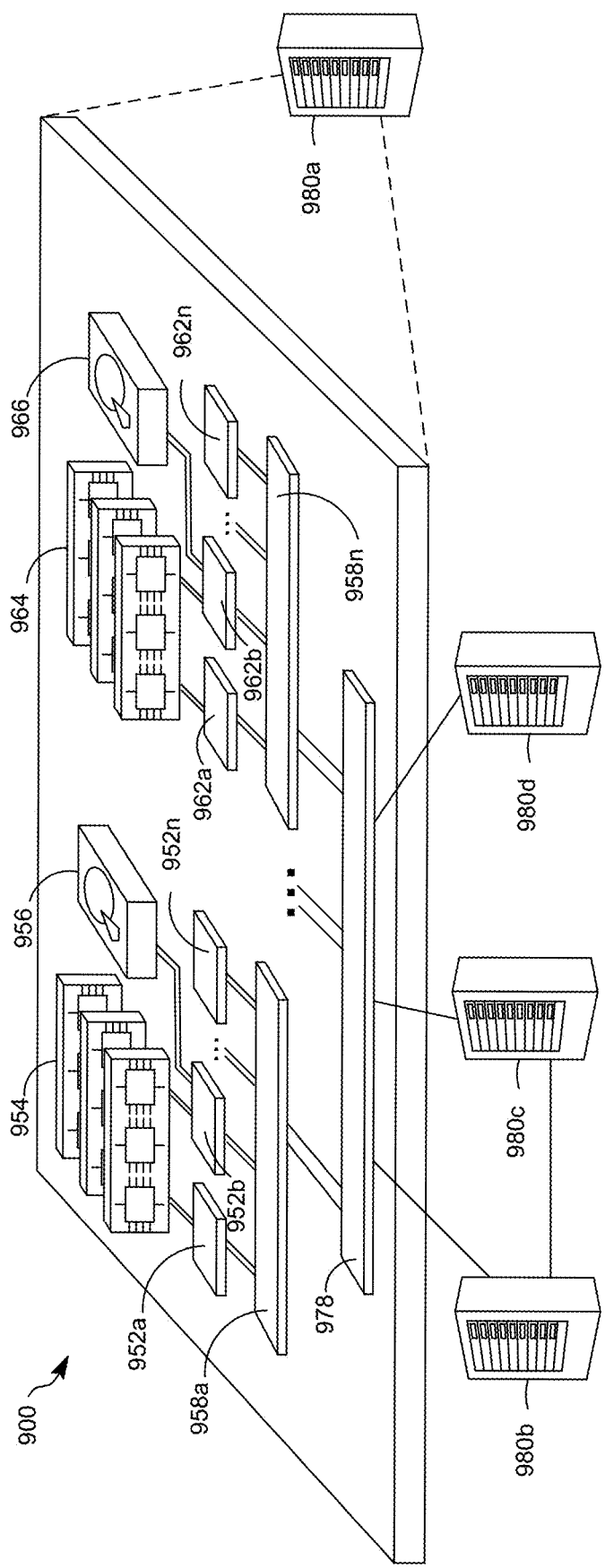
FIG. 9 shows an example of a distributed computer device that can be used to implement the described techniques.

The personal entity modeling system 100 may include a server 170, which may be a computing device or devices that take the form of a number of different devices, for example a standard server, a group of such servers, or a rack server system. For example, server 170 may be implemented in a distributed manner across multiple computing devices. In addition, server 170 may be implemented in a personal computer, for example a laptop computer. The server 170 may be an example of computer device 800, as depicted in FIG. 8, or computer device 900, as depicted in FIG. 9. Server 170 may include one or more processors formed in a substrate configured to execute one or more machine executable instructions or pieces of software, firmware, or a combination thereof. The processors can be semiconductor-based—that is, the processors can include semiconductor material that can perform digital logic.

The server 170 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 170. In some implementations, the modules may perform one or more of the functions of the screen content engine 122, the personal entity detection engine 124, the personal entity modeling engine 126, or the recommendation engine 128. In some implementations, server 170 may store backup copies of one or more of the information files in data store 130, may provide source data for one or more of the information files in data store 130.

For example, server 170 may include screen content engine 172, entity modeling engine 176, and/or recommendation engine 178. For example, the screen content engine 172 may receive a screen capture image from the screen content engine 122 on computing device 110 and may perform the recognition to identify key items in the image. Accordingly, the screen content engine 172 may include components that analyze the screen content in a screen capture image and identify key items, such as words, entities, logos, etc., in the screen content. Identified entities may be entities that are in the public knowledge base 184 and/or in a personal knowledge base 182 associated with a user account. Accordingly, the screen content engine 172 can be configured to perform various types of recognition, such as character recognition, image recognition, logo recognition, etc., using conventional or later developed techniques. In some implementations, the screen content engine 172 may index the key items, as discussed above, storing the inverted index in screen capture index 186. The screen capture index 186 is associated with a user of the computing device 110.

In some implementations, the screen content engine 172 may provide recognized items to the personal entity detection engine 124 on computing device 110, or may provide recognized items to an entity modeling engine 176. The entity modeling engine 176 may identify personal entities from the captured screen (or window of screens), as described above with regard to the personal entity detection engine 124. In some implementations, the entity modeling engine 176 may also update the embedding of personal entities identified in the screen content, as described above with regard to the personal entity modeling engine 126. Thus, the entity modeling engine 176 may perform one or more of the functions of the personal entity detection engine 124 or the personal entity modeling engine 126. The entity modeling engine 176 may therefore update the personal knowledge base 134 or personal knowledge base 182.

The server 170 may store public knowledge base 184. The public knowledge base 184 may be a large graph-based data store that stores data and rules that describe knowledge about the data in a form that provides for deductive reasoning. A knowledge base with a large number of entities and even a limited number of relationships may have billions of connections. In some implementations, knowledge base 184 may be stored in an external storage device accessible from server 170 and/or computing device 110. In some implementations, the public knowledge base 184 may be distributed across multiple storage devices and/or multiple computing devices, for example multiple servers. The entities and relationships in the public knowledge base 184 may be searchable, e.g., via an index. For example, the index may include text by which an entity has been referred to. Thus, reference to the knowledge base 184 may be understood to include an index that facilitates finding an entity using a text equivalent.

The computing device 110 may be in communication with the server 170 and with other mobile devices over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160 the server 170 may communicate with and transmit data to/from computing device 110 and computing device 110 may communicate with other mobile devices (not shown).

The personal entity modeling system 100 represents one example configuration and implementations may incorporate other configurations. For example, some implementations may combine one or more of the components of the screen content engine 122, the personal entity detection engine 124, the personal entity modeling engine 126, or the recommendation engine 128 into a single module or engine. Similarly, some implementations may combine one or more of the screen content engine 172, the entity modeling engine 176, or the recommendation engine 178 into a single module or application. As another example one or more of the data stores, such as the screen capture index 146, the public knowledge base 144, or the personal knowledge base 134 may be combined into a single data store or may distributed across multiple computing devices, or may be stored at the server 170 or another location specified by the user. Moreover, in certain embodiments aspects of the methods described herein may take place on the computing device 110 without communication with server 170, such as for privacy, low latency, operation outside of network range, etc.

To the extent that the personal entity modeling system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to store screen capture images and content. For example, the system may refrain from capturing content for certain applications, such as banking applications, health applications, or other similar applications or where capturing such content violates terms of service. In addition, the user may be provided with the opportunity to disable capturing screen content for specific applications or categories of applications. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile personal entity modeling system.

Figure 2:
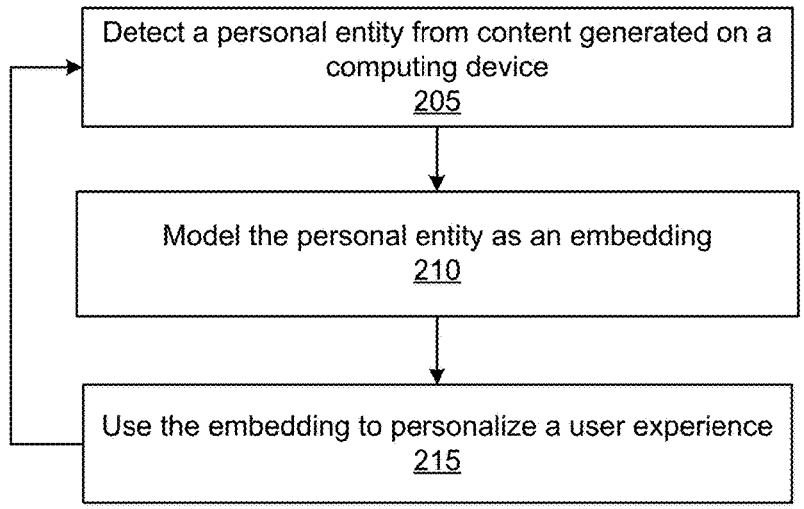
FIG. 2 illustrates a flow diagram of an example process for discovering and using personal entities to personalize a user experience, in accordance with the disclosed subject matter.

FIG. 2 illustrates a flow diagram of an example process 200 for discovering and using personal entities to personalize a user experience, in accordance with the disclosed subject matter. Process 200 may be performed by a mobile personal entity modeling system, such as system 100 of FIG. 1. Process 200 may be used to detect personal entities and model them as embeddings, which enables the system to personalize the user experience in various flexible ways. Process 200 may begin by detecting a personal entity in content generated for display on a computing device (205). The system may use screen capture images or API calls to obtain information displayed on the screen and perform recognition on the information, as discussed above with regard to FIG. 1. The system may detect the personal entity based on association with a particular data field (e.g., a recipient address in an email application), based on frequent n-grams appearing in private-content applications, or based on conventional entity detection techniques for text and images. A personal entity may be an entity not found in a public knowledge base. The system may model the personal entity as an embedding (210). In some implementations, the system may only model personal entities that have been detected a minimum number of times. The modeling may begin with an initial embedding which is then modified by a machine learning prediction model based on examples provided to the model. For example, the system may obtain screen information (e.g., from screen captures or API calls) on a periodic basis and provide the prediction model with the context in which the personal entity occurs as training examples. As described below with regard to FIG. 3, the context provided as training examples may depend on the implementation.

Once the embedding has been sufficiently trained, the system may use the embedding for the personal entity to personalize the user experience (215). Sufficient training may be determined, for example, when the personal entity has been encountered a certain number of times, one an error rate for classifications involving the personal entity (on the training data) falls below a certain threshold, etc. Personalizing the user experience may include a variety of functionalities. For example, the system may predict words or phrases based on content onscreen. The onscreen content can include both other personal entities and public entities. As another example, the system may use the embeddings to identify similar personal entities, such as personal entities that co-occur with a particular topic or event (e.g., an anime discussion, lunch during weekdays, or playing football). As another example, the system may use embeddings for a topic classifier, which can predict when a user might want to contact a particular person based on the onscreen context. For instance, the system may determine that as the user views information for a restaurant, the user typically dines with three personal entities and may suggest sharing the information for the restaurant or a reservation at the restaurant with the three personal entities.

Similarly, the system may determine the user is chatting with one or more personal entities and may suggest topics of discussion. For example, the embeddings may indicate that a group of personal entities are mentioned often in the context of movies and when the user is chatting with one or more members of the group may suggest a new movie or a recent news item for an actor to discuss. As another example, the system may provide personalized advertising based on the embeddings. For instance, the system may provide an ad for a new movie for onscreen personal entities that the embeddings indicate co-occur in the context of movies. As another example, the system may use the embeddings for nearest neighbor retrieval in an on-device search. Accordingly, if the user searches for a particular entity the system may provide nearest neighbor matches for the search to enhance the search results. These illustrations of personalizing the user experience from the embeddings are provided as examples only and implementations can include other uses of the embeddings to personalize the user experience.

Figure 3:
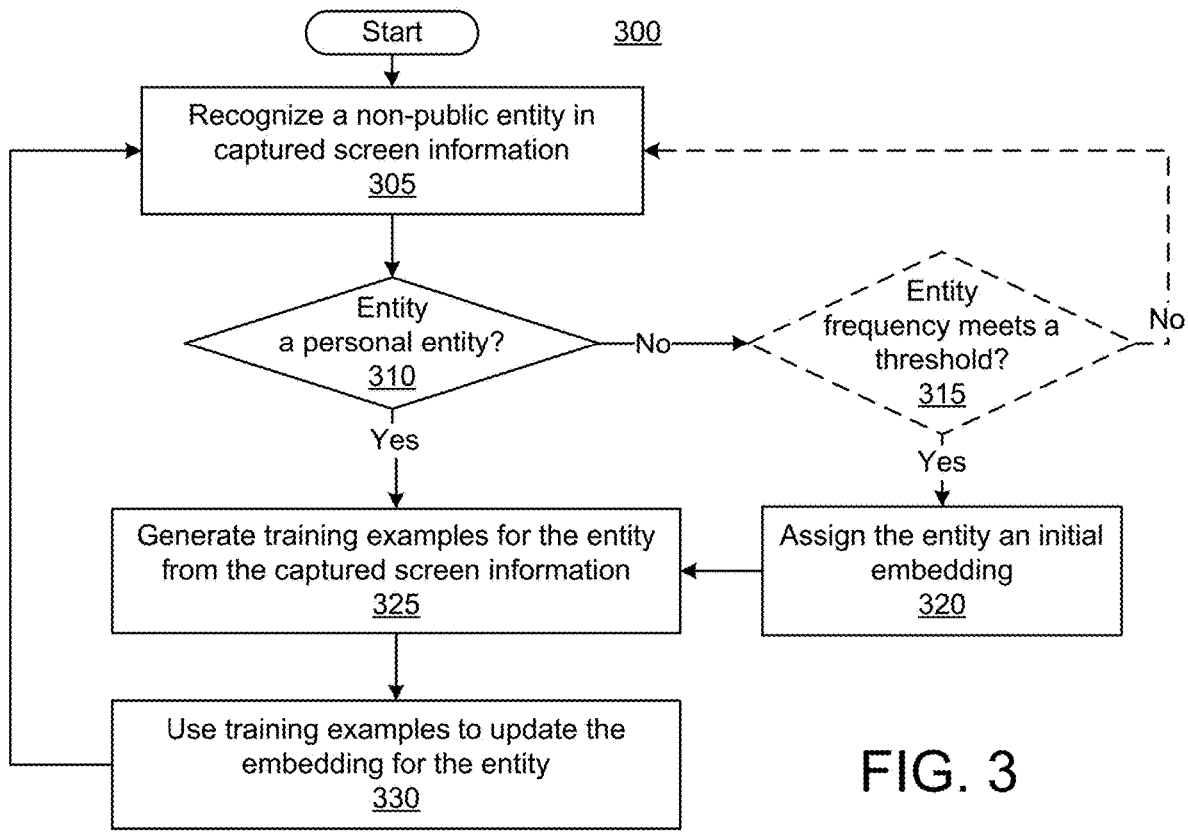
FIG. 3 illustrates a flow diagram of an example process for modeling personal entities, in accordance with disclosed implementations.

FIG. 3 illustrates a flow diagram of an example process 300 for modeling personal entities, in accordance with disclosed implementations. Process 300 may be performed by a mobile personal entity modeling system, such as system 100 of FIG. 1. Process 300 may be used to detect personal entities and model them as embeddings. Process 300 may begin by detecting a non-public entity in captured screen information (305). As discussed above, a non-public entity is an entity that does not exist in a public knowledge base, e.g., a public knowledge base accessed by the system. If the public knowledge base used by the system lacks the entity, it is a non-public entity. The non-public entity may be recognized in images as well as text. For example, some images have an associated description and the description may be or include a description or other identifier for the non-public entity. Examples of this are images associated with a contact or images tagged to a social media user identifier. The system may determine whether the non-public entity is a personal entity (310). If the entity exists already in a personal knowledge base, such as personal knowledge base 134 of FIG. 1, the entity is a personal entity (310, Yes). If not (310, No), the system may determine whether the non-public entity has been encountered frequently enough to be considered a personal entity (315). The frequency may depend on the method used to detect the entity. For example, entities detected based on a field type (e.g., a sender email address) may only need to appear once, while an entity that is an n-gram detected from content generated by a private content application may need to be encountered several times. Thus the frequency threshold may be implementation-specific as well as source-specific (e.g., different sources having differing thresholds). If the frequency threshold is not met (315, No) the system may continue analyzing screen content to find other occurrences of the entity (305). If the frequency threshold is met (315, Yes), the system may assign the entity an initial embedding (320). The initial embedding can be randomly assigned or a default assigned based on entity type. For example, person entities may have a different initial embedding from address entities, topic entities, or phone number entities, etc. The initial embedding and the non-public entity are added to the personal knowledge base as part of step 320, so that the system may begin modeling the personal entity as an embedding.

The system may generate training examples for the personal entity from the captured screen information (325). The training examples may include various information detected from the screen capture information. For example, the training examples may include other personal entities identified in the screen capture information, public entities identified in the screen capture information, a combination of public and personal entities identified in the screen capture information, structural properties, such as formatting and layout, of where and how the personal entity appears onscreen, metadata about the state of the computing device, metadata about the currently running application, etc. In some implementations, the training examples may be based on screen capture information for one screen. In some implementations, the training examples may be based on screen capture information from a window of past screens or past and future screens. In other words, the system may delay generating the training examples until a window of time has passed and may include screen capture events from the window of time to generate the training examples. In implementations that use a window of time, some of the training examples may include actions taken by the user subsequent to the screen capture event where the personal entity was detected. For example, if the user often switches to a reservation application after discussing a particular topic (e.g., lunch), the system may include a training example that predicts the reservation application given the topic. The system may use the training examples to train the prediction model, thus updating the embedding for the personal entity (330). The system may perform process 300 on a continuous basis, so long as the user settings permit it, to refine the embedding for the entity. This allows the system may eventually use the embedding to provide personalized assistance based on the embedding when the personal entity is encountered in onscreen content or associated with onscreen content.

Figure 4:
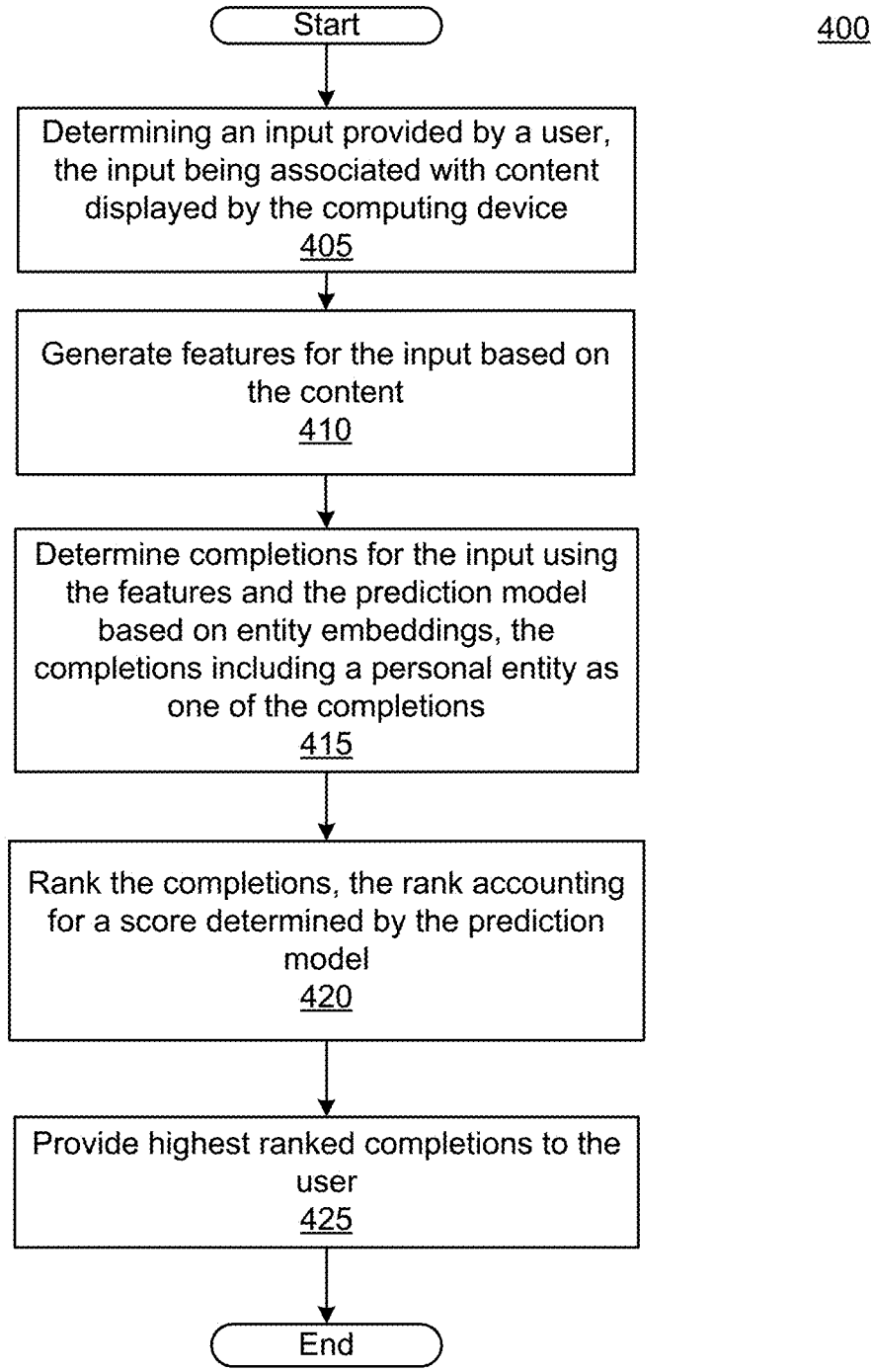
FIG. 4 illustrates a flow diagram of an example process for using modeled personal entities to customize a user experience, in accordance with disclosed implementations.

FIG. 4 illustrates a flow diagram of an example process 400 for using modeled personal entities to customize a user experience, in accordance with disclosed implementations. Once the prediction model is trained, the system may use the prediction model in various ways. One way may be to provide entities, both personal and private, as suggestions in an auto-completion operation. The trained prediction model may predict words or phrases based on other onscreen content. This differs from traditional auto-complete operations that use only what the user has already typed. A benefit of process 400 over conventional auto-complete operations is that process 400 can suggest the words or phrases even in the absence of any characters provided by the user. In other words, process 400 can provide a suggested entity upon determining that the user has placed a cursor in a text box, prior to the user entering any text. Process 400 may be executed by a mobile personal entity modeling system, such as system 100 of FIG. 1. Process 400 is an example of using the embeddings to personalize a user experience, as described with regard to step 215 of FIG. 2. Process 400 may be executed on a recurrent basis by the system—for example, when a user initially sends focus to an input control, such as a text box, the system may perform process 400 and provide a list of entities as suggested completions. If the user does not select one of the completions, the system may perform process 400 again after receiving input from the user, for example after each text input is received, using the text input to refine the entities suggested as completions.

Process 400 begins by determining an input provided by a user (405). The actual input may be blank or null, representing an intention to provide input. For example, when the user sends focus to an input control, such as a placing a cursor in a text box, the system may determine the user intends to provide an input and determine that the input is currently blank or null. If the user has provided any text, numbers or characters, via the input control the system may determine the input includes the provided text. The system may also determine content displayed by the computing device that is associated with the input. For example, the system may determine other entities displayed in the screen capture information associated with the input control, e.g., entities displayed on the current screen or entities displayed in a window that includes the current screen. The entities recognized in the screen capture information and metadata for the screen capture information are content associated with the input. The system may generate a set of features for the input based on the content (410). The features include the other entities and metadata about the current screen. For example, features may include the executing application, where on the screen the input occurs, a type of entity typically associated with the input control (e.g., a person or a place), etc.

The system may then determine completions for the input (415). The system may determine the completions using conventional methods (e.g., words known to start with the input provided by the user), as well as completions determined using the features and the prediction model. In other words, the system may provide the features to the prediction model, which may in turn provide some completions for the input based on the embeddings and features. The completions provided by the prediction model may be a personal entity, a group of personal entities, a public entity, a topic, etc. in the form of words or phrases that describe the entity or entities. For example, the words may describe a category or topic that relates the group of entities. As another example, the words may describe an entity. In determining completions, the prediction model may provide only completions that meet a probability threshold. In other words, only the most probable completions, including people, places, topics, may be provided by the prediction model as completions. The system may rank the completions, the ranking accounting for a score determining by the prediction model based on the embeddings (420). The score may represent the probability that the completion is predicted based on the features provided. The rank for a completion provided by the prediction model may account for this score and a determination of how closely the words/phrases associated with the completion match the input provided thus far by the user. For example, when the input is null, the rank may rely solely on the probability score. When the input includes three characters, the rank may be a combination of the probability score and a score reflecting how closely the words/phrases match the three characters. This allows the system to account for misspellings and typographical errors by the user. For example, a very highly probable predicted completion may still have a high rank even if only two of the first three characters in the description of the completion match the three characters provided by the user.

The system may provide the highest ranked completions to the user as suggestions (425). This may allow the user to complete the input with fewer keystrokes. In some cases, the user may only need to place a cursor in a text box before selecting one of the predicted completions, thus avoiding any keystrokes at all. Thus, process 400 is an example of improving the user experience by providing personalized completions based on personal entities modeled as embeddings.

Figure 5:
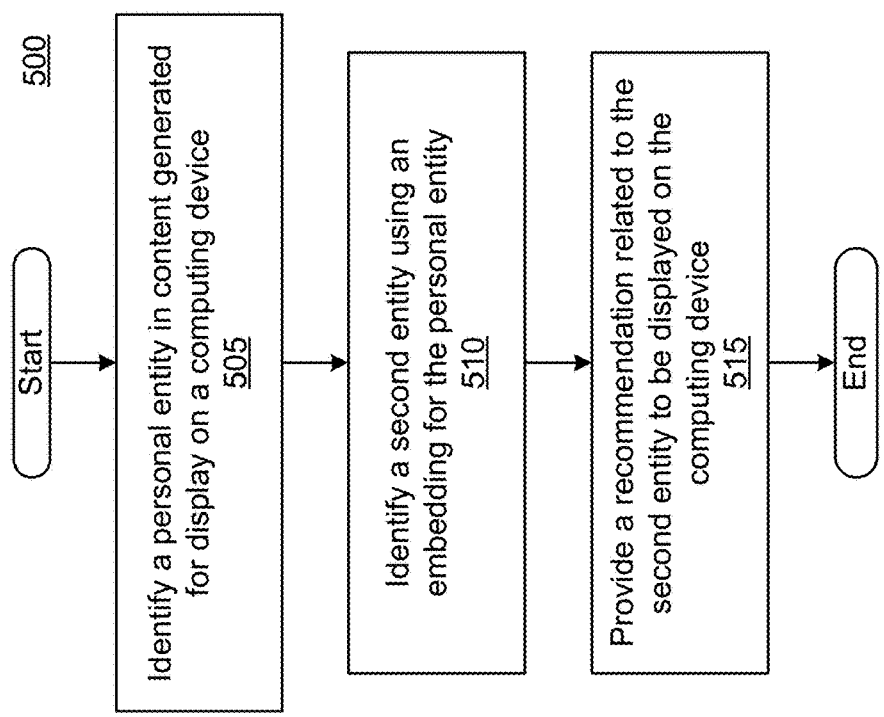
FIG. 5 illustrates a flow diagram of another example process for using modeled personal entities to customize a user experience, in accordance with disclosed implementations.

FIG. 5 illustrates a flow diagram of another example process 500 for using modeled personal entities to customize a user experience, in accordance with disclosed implementations. Process 500 illustrates another way to use the prediction model to customize the user experience by providing a recommendation related to an interest associated with personal entities displayed on a current screen. A benefit of process 500 over conventional recommendation systems is that process 500 can suggest recommendations related to personal entities, not just public entities. Modeling personal entities has been a challenging problem because modeling entities typically requires a significant amount of input. For example, the curation of public knowledge bases has included hundreds of thousands of man-hours. This is not feasible on a personal level. Moreover, knowledge bases typically include information about entities in the form of relationships between entities. This type of representation is also not feasible on a personal level. The personal knowledge base used in process 500 represents personal entities as embeddings, so that the user does not need to actively populate and train the knowledge base. Instead, the personal knowledge base takes advantage of a machine-learning prediction model. Thus, process 500 may be executed by a mobile personal entity modeling system, such as system 100 of FIG. 1. Process 500 is an example of using the embeddings to personalize a user experience, as described with regard to step 215 of FIG. 2. Process 500 may be executed on a continual basis by the system—for example, the system may perform process 500 on a periodic basis to display an advertisement related to the onscreen content or to suggest a topic of conversation in a personal communication type application.

Process 500 begins by identifying a personal entity in content generated for display on a computing device (505). The content may be associated with a screen capture event or a window of screen capture events. The system may identify the personal entity using the recognition techniques described above with regard to the screen content engine 122 and personal entity detection engine 124 as well as step 205 of FIG. 2 and step 305 of FIG. 3. The system may identify a second entity related to the personal entity using the embedding for the personal entity (510). In other words, the system may provide a prediction model with features generated from the screen capture content and the personal entity identified and the prediction model may predict a second entity based on the features and embedding for the personal entity. The second entity may be another personal entity or may be a public entity. The personal and public entities may represent people, places, contexts, topics, hobbies, activities, etc. often associated with the personal entity. For example, the system may determine that the personal entity Rob is often associated with discussions about football (likely a public entity, but possibly a personal entity). As another example, the system may determine that the personal entity Alice is often associated with a context, such as lunch at Uncle Joe's. A context can represent the time or location of an event.

The system may then provide a recommendation related to the second entity and initiate display of the recommendation on the computing device (515). The recommendation can be an advertisement related to the second entity, a suggested topic of conversation related to the second entity, a circle of friends related to the second entity (e.g., a topic or interest), etc. For example, when the user starts a conversation with Rob, the system may provide an advertisement for a new football movie or the details of an upcoming football game. As another example, the system may suggest adding Tom to the conversation with Rob, as Tom may be a second personal entity that is associated with football. Similarly, the system may recommend making a reservation at Uncle Joes when the user is chatting with Alice about lunch. These are provided as non-exhaustive examples of how the system may use process 500 to provide personalized recommendations based on onscreen content. In some implementations, the system may use a selected recommendation as a training example for the prediction model. Process 500 then ends.

Figure 6:
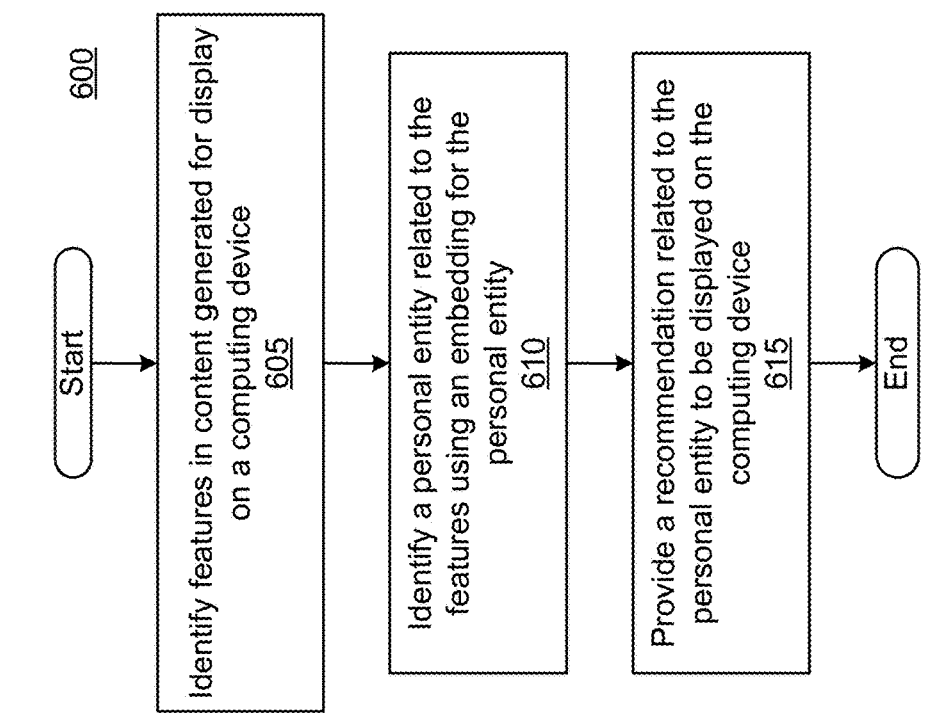
FIG. 6 illustrates a flow diagram of another example process for using modeled personal entities to customize a user experience, in accordance with disclosed implementations.

FIG. 6 illustrates a flow diagram of another example process 600 for using modeled personal entities to customize a user experience, in accordance with disclosed implementations. Process 600 illustrates another way to use the prediction model to customize the user experience by providing a recommendation related to a personal entity associated with a current screen. Process 600 may be executed by a mobile personal entity modeling system, such as system 100 of FIG. 1. Process 600 is an example of using the embeddings to personalize a user experience, as described with regard to step 215 of FIG. 2. Process 600 may be executed on a continual basis by the system—for example, the system may perform process 600 on a periodic basis to suggest a personal entity to include in a conversation, to share a screen or information on a screen with, or to include in a reservation, etc., based on public entities identified in the screen content.

Process 600 begins by identifying features in content generated for display on a computing device (605). The content may be associated with a screen capture event or a window of screen capture events. The features may include public entities, a context, personal entities, etc. A context may represent the time and/or location of an event (e.g., dinner at Luigis). Entities, whether public or private, may represent people, places, topics, hobbies, activities, etc. The system may identify the features using the recognition techniques described above with regard to the screen content engine 122 and personal entity detection engine 124 as well as step 205 of FIG. 2 and step 305 of FIG. 3. As indicated herein, a window of screen capture information may be used as context for identifying the features in the content. The system may identify a personal entity predicted by the features using the embedding for the personal entity (610). In other words, the system may provide a prediction model with the features generated from the content and the prediction model may predict the personal entity based on the features. The personal entity may represent a person, topic, hobby, activity, etc., found in the personal knowledge base. For example, the system may determine that Alice is associated with Italian restaurants. The system may then provide a recommendation related to the personal entity and initiate display of the recommendation on the computing device (615). The recommendation can be an advertisement related to the interest, a suggested topic of conversation related to the interest, a circle of friends related to the interest, an action related to a context, etc. For example, when the user indicates a desire to share an article about football, the system may recommend Rob and Tom as recipients. As another example, if the user is looking at the lunch menu at Uncle Joe's, the system may suggest an action such as sharing the screen with Alice or including Alice in a calendar invite for lunch at Uncle Joe's. These are provided as non-exhaustive examples of how the system may use process 600 to provide personalized recommendations based on onscreen content. In some implementations, if a user selects a recommendation the system may use the selection as a positive training example for the personal entity. Process 600 then ends.

Figure 7:
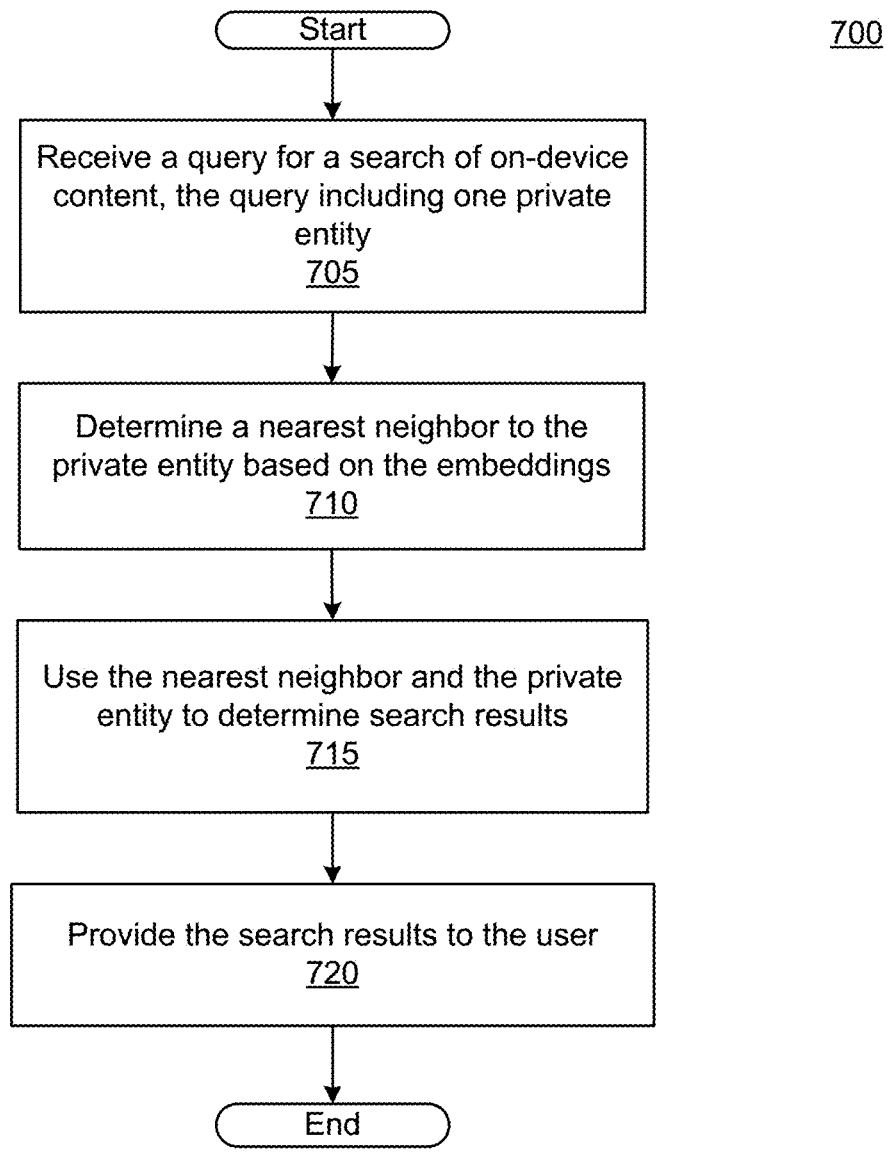
FIG. 7 illustrates a flow diagram of another example process for using modeled personal entities to customize a user experience, in accordance with disclosed implementations.

FIG. 7 illustrates a flow diagram of another example process 700 for using modeled personal entities to customize a user experience, in accordance with disclosed implementations. Process 700 illustrates another way to use the prediction model to customize an on-device search by finding related personal entities and including these in the search results provided to the user. Process 700 may be executed by a mobile personal entity modeling system, such as system 100 of FIG. 1. Process 700 is an example of using the embeddings to personalize a user experience, as described with regard to step 215 of FIG. 2. Process 700 may be initiated by the user, e.g., through an explicit search request, or by the system as the result of an implicit search request by request.

Process 700 begins by receiving a query for an on-device search (705). The query may include a personal entity. The system may identify the personal entity in the query based on entity recognition techniques described above with regard to the screen content engine 122 and personal entity detection engine 124 as well as step 205 of FIG. 2 and step 305 of FIG. 3. The system may determine a nearest neighbor to the personal entity based on the embeddings (710). In other words, the system may look for approximate matches to the personal entity based on similarity of the embeddings using conventional nearest neighbor techniques. The system may use the nearest neighbor and the personal entity to determine search results (715) and provide the search results to the user (720). The search results can be obtained from, for example, an index of screen captures or from a directory of files, etc. Process 700 then ends.

For example, the prediction model may include two personal entities, Bill and Jason. Bill and Jason may have very similar embeddings because both often appear in the same context (e.g., are included in the same calendar invites, are include in group text conversations, included in the same email, etc.). When the user is searching for a conversation with Bill or a picture of Bill, the system may also include conversations with Jason or pictures of Jason. This enables the system to provide search results that are similar to what the user asked for in the event that the user mistakenly thought the searched for conversation was associated with Rob and not Jason or that the sought for picture was labeled with Jason but not Rob. As another example, a user may search for "tennis" on the computing device. In response to this query, the system may use the prediction model to determine that a personal entity (or two or more personal entities) are related to tennis and return conversations with the personal entity in response to the query for tennis, even if the conversations do not include the term tennis.

FIG. 8 shows an example of a generic computer device 800, which may be operated as server 170, and/or device 110 of FIG. 1, which may be used with the techniques described here. Computing device 800 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computing device, such as a laptop computer 832, personal computer 834, or tablet/smart phone 836. An entire system may be made up of multiple computing devices 800 communicating with each other. Other configurations are possible.

FIG. 9 shows an example of a generic computer device 900, which may be server 170 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

According to certain aspects of the disclosure, a mobile device comprises at least one processor and memory storing instructions that, when executed by the at least one processor, cause the mobile device to perform operations. The operations may include identifying a personal entity in content generated for display on the mobile device, generating training examples for the personal entity from the content, and updating an embedding used to model the personal entity using the training examples. The personal entity may be personal to the user of the mobile device. The embedding may be used to make predictions regarding the personal entity.

This and other aspects can include one or more of the following features. For example, the personal entity may be identified based on location in a sender or recipient field of a message. As another example, identifying the personal entity can include identifying an n-gram in the content and determining that a frequency of occurrence for the n-gram in private-content applications meets or exceeds a threshold. As another example, identifying the personal entity can include determining whether the personal entity is present in a personal knowledge base and assigning the personal entity an initial embedding when the personal entity does not exist in the personal knowledge base. As another example, the content is first content and the memory further stores instructions that cause the mobile device to identify input provided by a user of the mobile device, the input being associated with second content displayed on the mobile device, determine completions for the input, the completions including the personal entity based on the second content, rank the completions, the rank of the personal entity accounting for a score determined by the embedding for the personal entity given the second content, and provide highest ranked completions for display on the mobile device.

As another example, generating the training examples include, for a set of other personal entities identified in the content, generating a prediction between the set and the personal entity. In another example, generating the training examples include, for public entities identified in the content, generating a prediction between the public entity and the personal entity. As another example, the personal entity is a first personal entity and generating the training examples include, for a second personal entity and a public entity identified in the content, generating a prediction between the second personal entity and the public entity and the first personal entity. In another example, the content generated for display includes content generated during a window of time.

According to certain aspects of the disclosure, a method includes identifying a first personal entity in content generated for display on a computing device, the first personal entity being associated with an embedding in a personal knowledge base associated with a user of the computing device, predicting an association between the first personal entity and a second entity based on the embedding, and providing a recommendation related to the second entity, the recommendation to be displayed on the computing device.

This and other aspects can include one or more of the following features. For example, the recommendation may be an advertisement related to the second entity. As another example, the second entity represents a topic and recommendation is a third personal entity associated with the second entity. In such an implementation, displaying the recommendation can include suggesting sharing the content with the third personal entity. The content may include a message and the recommendation can be an invitation for the third personal entity to view the message. As another example, the second entity may represent a context and displaying the recommendation can include suggesting an action that includes the first personal entity and the context. In some implementations, the context is a time and the action is a reservation related to the first personal entity.

According to certain aspects of the disclosure, a computing system includes at least one processor, a display device, memory storing a personal knowledge base, the personal knowledge base modeling personal entities as embeddings and memory storing instructions that, when executed by the at least one processor, cause the computing system to perform operations. The operations may include identifying features in content generated for display on the display device, identifying a personal entity predicted by the features using an embedding for the personal entity in the personal knowledge base, and providing a recommendation related to the personal entity, the recommendation to be displayed on the display device.

This and other aspects can include one or more of the following features. For example, the recommendation may be an action involving the personal entity or a suggestion to share the content associated with a current screen with the personal entity. As another example, the content generated for display may be generated by a first application and the recommendation is a suggestion to open a second application. The second application may not be installed on the computing device and the suggestion may include installing the second application. As another example, the recommendation is a completion for an input control prior to receiving input from a user in the input control.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A mobile device comprising:
at least one processor;
a display device; and
memory storing instructions that, when executed by the at least one processor, cause the mobile device to:
 capture, at intervals, screen content generated for display via the display device of the mobile device,
 identify, for each of the intervals, a personal entity in the screen content generated for display on the mobile device,
 prior to identifying the personal entity in the screen content:
  identify a plurality of potential personal entities in the screen content generated for display on the mobile device; and
  classify a given one of the plurality of potential personal entities as the personal entity based on a frequency of occurrence of the personal entity, at the mobile device, satisfying a frequency threshold that is determined based on the screen content;
 generate training examples for the personal entity from the screen content, and
 update an embedding, of an embedding space, used to model the personal entity using the training examples, wherein the embedding space includes an additional embedding used to model an additional personal entity, and wherein a distance between the embedding and the additional embedding, in the embedding space, is determined.

2. The mobile device of claim 1, wherein the personal entity is identified based on location in a sender or recipient field of a message.

3. The mobile device of claim 1, wherein identifying the personal entity includes:
   identifying an n-gram in the screen content; and
   determining that a frequency of occurrence for the n-gram in private-content applications meets or exceeds a threshold.

4. The mobile device of claim 1, wherein identifying the personal entity includes:
   determining whether the personal entity is present in a personal knowledge base; and
   assigning the personal entity an initial embedding when the personal entity does not exist in the personal knowledge base.

5. The mobile device of claim 1, wherein the screen content is first screen content and the memory further stores instructions that, when executed by the at least one processor, cause the mobile device to:
   identify input provided by a user of the mobile device, the input being associated with second screen content displayed on the mobile device;
   determine completions for the input, the completions including the personal entity based on the second screen content;
   rank the completions, the rank of the personal entity accounting for a score determined by the embedding for the personal entity given the second screen content; and
   provide highest ranked completions for display on the mobile device.

6. The mobile device of claim 1, wherein generating the training examples include, for a set of other personal entities identified in the screen content, generating a prediction between the set and the personal entity.

7. The mobile device of claim 1, wherein generating the training examples include, for public entities identified in the screen content, generating a prediction between the public entity and the personal entity.

8. The mobile device of claim 1, wherein the screen content generated for display includes screen content generated during a window of time.

9. The mobile device of claim 1, wherein each of the intervals is based on occurrence of a touch event, or occurrence of a transition from a first mobile application to a second mobile application.

10. The mobile device of claim 9, wherein generating the training examples includes:
    including, in a given one of the training examples, the personal entity in the screen content during the occurrence of a touch event; and
    including, in the given one of the training examples, the additional personal entity in the screen content during the occurrence of the touch event.

11. The mobile device of claim 1, wherein the screen content is captured, at each of the intervals, for a corresponding window of time that includes an occurrence of a transition from a first mobile application to a second mobile application.

12. The mobile device of claim 11, wherein generating the training examples includes:
    including, in a given one of the training examples, at least the personal entity in the screen content for the corresponding window of time; and
    including, in the given one of the training examples, an action performed by the mobile device subsequent to the corresponding window of time.

13. The mobile device of claim 1, wherein in determining the frequency threshold based on the screen content, the at least one processor is to determine the frequency threshold based on a field type of a field in which the personal entity occurs in the screen content.

14. The mobile device of claim 1, wherein in determining the frequency threshold based on the screen content, the at least one processor is to determine the frequency threshold based on an application type of an application rendering the screen content.

15. A computer-implemented method by one or more processors of a mobile device comprising:
    capturing, at intervals and by one or more of the processors of the mobile device, screen content generated for display via a display device of the mobile device;
    identifying, for each of the intervals and by one or more of the processors of the mobile device, a personal entity in the screen content generated for display on the mobile device;
    prior to identifying the personal entity in the screen content:
        identifying a plurality of potential personal entities in the screen content generated for display on the mobile device; and
        classifying a given one of the plurality of potential personal entities as the personal entity based on a frequency of occurrence of the personal entity, at the mobile device, satisfying a frequency threshold that is determined based on the screen content;
    generating, by one or more of the processors of the mobile device, training examples for the personal entity from the screen content; and
    updating, by one or more of the processors of the mobile device, an embedding, of an embedding space, used to model the personal entity using the training examples, wherein the embedding space includes an additional embedding used to model an additional personal entity, and wherein a distance between the embedding and the additional embedding, in the embedding space, is determined.

16. The method of claim 15, wherein the personal entity is identified based on location in a sender or recipient field of a message.

17. The method of claim 15, wherein identifying the personal entity comprises:
    identifying, by one or more of the processors of the mobile device, an n-gram in the screen content; and
    determining, by one or more of the processors of the mobile device, that a frequency of occurrence for the n-gram in private-content applications meets or exceeds a threshold.

18. The method of claim 15, wherein identifying the personal entity comprises:
    determining, by one or more of the processors of the mobile device, whether the personal entity is present in a personal knowledge base; and
    assigning, by one or more of the processors of the mobile device, the personal entity an initial embedding when the personal entity does not exist in the personal knowledge base.

19. The method of claim 15, wherein the screen content is first screen content, and wherein the method further comprises:

identifying, by one or more of the processors of the mobile device, input provided by a user of the mobile device, the input being associated with second screen content displayed on the mobile device;

determining, by one or more of the processors of the mobile device, completions for the input, the completions including the personal entity based on the second screen content;

ranking, by one or more of the processors of the mobile device, the completions, the rank of the personal entity accounting for a score determined by the embedding for the personal entity given the second screen content; and providing, by one or more of the processors of the mobile device, highest ranked completions for display on the mobile device.

20. The method of claim 15, wherein determining the frequency threshold based on the screen content comprises determining the frequency threshold based on a field type of a field in which the personal entity occurs in the screen content.

21. The method of claim 15, wherein determining the frequency threshold based on the screen content comprises determining the frequency threshold based on an application type of an application rendering the screen content.

* * * * *